(12) United States Patent
Kimura et al.

(10) Patent No.: US 8,592,046 B2
(45) Date of Patent: Nov. 26, 2013

(54) SURFACE PROTECTIVE FILM

(75) Inventors: Yoichiro Kimura, Chiba (JP); Tomoyuki Kitajima, Chiba (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 154 days.

(21) Appl. No.: 13/132,162

(22) PCT Filed: Nov. 27, 2009

(86) PCT No.: PCT/JP2009/070033
§ 371 (c)(1),
(2), (4) Date: Jun. 1, 2011

(87) PCT Pub. No.: WO2010/064583
PCT Pub. Date: Jun. 10, 2010

(65) Prior Publication Data
US 2011/0236676 A1 Sep. 29, 2011

(30) Foreign Application Priority Data

Dec. 1, 2008 (JP) ................................ 2008-306410

(51) Int. Cl.
*B32B 27/32* (2006.01)
*B32B 27/00* (2006.01)
*B32B 27/08* (2006.01)
*B29C 47/00* (2006.01)

(52) U.S. Cl.
USPC ........... 428/515; 428/220; 428/332; 428/336; 428/500; 156/244.11

(58) Field of Classification Search
None
See application file for complete search history.

(56) References Cited

U.S. PATENT DOCUMENTS

| 5,286,781 A * | 2/1994 | Gotoh et al. ................. 524/505 |
| 5,427,850 A | 6/1995 | Gotoh et al. |
| 6,649,681 B2 * | 11/2003 | Rohn et al. ..................... 524/356 |
| 2007/0134475 A1 | 6/2007 | Yuruzume et al. |
| 2010/0189999 A1 | 7/2010 | Kimura et al. |

FOREIGN PATENT DOCUMENTS

| CN | 1982048 | 6/2007 |
| JP | 61-103975 A | 5/1986 |
| JP | 5-194923 A | 8/1993 |
| JP | 2713519 B2 | 10/1997 |
| JP | 10-298514 A | 11/1998 |
| JP | 2000-80336 A | 3/2000 |
| JP | 2000-136367 A | 5/2000 |
| JP | 2002-249613 A | 9/2002 |
| WO | 2008/149708 A1 | 12/2008 |

OTHER PUBLICATIONS

International Preliminary Report on Patentability, issued on Aug. 9, 2011, in corresponding PCT/JP2009/070033.
Written Opinion, dated Jan. 26, 2010, issued in corresponding PCT/JP2009/070033.
International Search Report, dated Jan. 26, 2010, issued in corresponding PCT/JP2009/070033.
Office Action for related patent application No. 200980147951.9 dated Nov. 30, 2012.
English Abstract of Office Action for related patent application No. 200980147951.9 dated Nov. 30, 2012.

* cited by examiner

*Primary Examiner* — Sheeba Ahmed
(74) *Attorney, Agent, or Firm* — Millen, White, Zelano & Branigan, P.C.

(57) ABSTRACT

A surface protective film includes: a polyolefin base material layer; and an adhesion layer, in which the adhesion layer includes: a vinyl-polyisoprene-block-containing styrene elastomer; a polyolefin; and a tackifier, and a hardness (Martens hardness) of the adhesion layer is 1.0 N/mm$^2$ or more and 2.5 N/mm$^2$ or less.

15 Claims, No Drawings

SURFACE PROTECTIVE FILM

TECHNICAL FIELD

The present invention relates to a surface protective film. In particular, the present invention relates to a surface protective film favorable for protecting a surface of an adherend having an irregular surface such as a prism sheet.

BACKGROUND ART

A surface protective film that is temporarily attached to a surface of a metal plate, a glass plate or a synthetic resin plate for preventing the surface from being damaged or being attached with dust has been known (e.g., Patent Literature 1 to Patent Literature 3).

For instance, Patent Literature 1 discloses a surface protective film formed by co-extruding a polyolefin resin base material and an adhesive layer, the adhesive layer including a composition that contains a block copolymer represented by a general formula A-B-A (A is a styrene copolymer block and B is a copolymer block of ethylene and butylene) and a tackifier resin.

The surface protective film disclosed in Patent Literature 1 can be laminated by co-extrusion and allows an adhesive to become solvent-free, so that the surface protective film is excellent in terms of environmental protection and safety and hygiene during manufacturing. Further, the surface protective film is economically favorable because its manufacturing process can be simplified.

CITATION LIST

Patent Literatures

Patent Literature 1: JP-A-61-103975
Patent Literature 2: JP-B-2713519
Patent Literature 3: JP-A-2000-80336

SUMMARY OF THE INVENTION

Problems to be Solved by the Invention

However, when a typical surface protective film as disclosed in Patent Literature 1 is rolled up and stored or transferred as a roll, an adhesive layer wound around a rear surface of a base material may firmly adhere to the base material.

Consequently, the surface protective film is not easily wound off from the roll, reducing efficiency of operation for attaching to a surface of an adherend. When the surface protective film is forcefully wound off, the base material may be partially stretched and deformed or the adhesive layer may be partially peeled off, so that the surface protective film may not function.

To solve these problems, a mold releasing agent is applied to or a mold releasing treatment such as corona treatment is applied to the rear surface of the base material.

However, in use of a mold releasing agent, a particular kind of mold releasing agent that firmly adheres to the base material but does not adhere to the adhesive layer is required. In addition, when the mold releasing agent seeps into the adhesive layer, the adhesive force of the surface protective film to the adherend may be reduced.

Further, due to a complicated process for applying a mold releasing agent or effecting a mold releasing treatment such as corona treatment, manufacturing cost of the surface protective film may be increased.

In order to solve the above problems, a method for controlling an adhesion strength has also been typically used. Such a method for controlling an adhesion strength is exemplified by a method disclosed in, for instance, Patent Literature 2, in which the amount of diblock in a styrene elastomer is adjusted to control an adhesion strength. In Patent Literature 3, an adhesion strength is controlled by adjusting the mixed amount of a tackifier.

However, in the method of Patent Literature 2, an increase in the amount of diblock, which can increase the adhesion strength, makes the film too sticky to unroll from the roll.

In the method of Patent Literature 3, an adjustable range of the mixed amount is too narrow to achieve both adhesion strength and unwinding property from the roll.

An object of the invention is to provide a surface protective film: being capable of solving the above problems; being moldable by co-extrusion; having an adhesion strength controllable by appropriately adjusting the hardness of an adhesion layer within a predetermined range; exhibiting an excellent unwinding property from a roll without applying a separating agent to a surface of a base material layer; and being capable of maintaining long-lasting stable adhesive force and unwinding property. Further, an object of the invention is to provide a surface protective film having an adhesion strength adjustable based on the hardness of at least either one of a styrene elastomer or a polyolefin contained in the adhesion layer.

Means for Solving the Problems

According to an aspect of the invention, a surface protective film including: a polyolefin base material layer; and an adhesion layer, in which the adhesion layer includes: a vinyl-polyisoprene-block-containing styrene elastomer; a polyolefin; and a tackifier, and a hardness (Martens hardness) of the adhesion layer is 1.0 N/mm$^2$ or more and 2.5 N/mm$^2$ or less.

In the surface protective film, it is preferable that a mass ratio of the polyolefin relative to the vinyl-polyisoprene-block-containing styrene elastomer is 0.1 or more and 2 or less, and a mass ratio of the tackifier relative to the vinyl-polyisoprene-block-containing styrene elastomer is 0.03 or more and 1 or less.

In the surface protective film, it is preferable that the styrene elastomer includes styrene at 5 mass % or more and 30 mass % or less and triblock copolymer at 80 mass % or more, and a glass transition temperature of the styrene elastomer is −40 degrees C. or more and 20 degrees C. or less.

In the surface protective film, it is preferable that the thickness of the adhesion layer is 5 µm or more and 25 µm or less.

In the surface protective film, it is preferable that the adhesion layer is laminated by co-extrusion.

With the above arrangement, it is possible to provide a surface protective film: being moldable by co-extrusion; having an adhesion strength controllable by appropriately adjusting the hardness of an adhesion layer within a predetermined range; exhibiting an excellent unwinding property from a roll without applying a separating agent to a surface of a base material layer; and being capable of maintaining long-lasting stable adhesive force and unwinding property. Further, it is possible to provide a surface protective film having an adhesion strength adjustable based on the hardness of at least either one of a styrene elastomer or a polyolefin contained in the adhesion layer.

EXEMPLARY EMBODIMENT OF THE INVENTION

An exemplary embodiment of the invention will be described below.

A surface protective film of the exemplary embodiment includes a base material layer and an adhesion layer.

The base material layer is not particularly limited as long as it is a sheet or film that is commonly used as a support of a surface protective film, examples of which include a film formed of a polyolefin material or the like.

Examples of polyolefin usable for the base material layer include low-density polyethylene, medium-density polyethylene, high-density polyethylene, linear low-density polyethylene, ethylene-α-olefin copolymer, ethylene-vinyl-acetate copolymer, ethylene-ethylacrylate copolymer, ethylene-methyl methacrylate copolymer, ethylene-n-butyl acrylate copolymer, and polypropylene (homopolymer, random copolymer, block copolymer). The resins as described above may be used alone or in combination. Especially, block copolymer polypropylene (BPP) is favorable as a material for the base material layer. The surface of the base material layer is roughened by using BPP and thus unwinding property is further enhanced while tearing strength and impact strength are also enhanced. Further, heat resistance and rigidity can be added.

Additives such as a pigment, an antioxidant, a stabilizer and an ultraviolet absorber may be added to the base material layer as needed.

The base material layer may be formed of a plurality of layers. The total thickness of the base material layer formed of a single layer or a plurality of layers is favorably 30 μm or more and 80 μm or less.

The adhesion layer contains a vinyl-polyisoprene-block-containing styrene elastomer, a polyolefin; and a tackifier.

The vinyl-polyisoprene-block-containing styrene elastomer contained in the adhesion layer is a block copolymer represented by a general formula (1) or general formula (2).

Formula 1

A-B-A          (1)

A-B            (2)

In the general formulae (1) and (2), A is a styrene block and B is a non-hydrogenated vinyl-polyisoprene block or hydrogenated vinyl-polyisoprene block represented by a general formula (3) as follows. The styrene elastomer contains an uncoupled styrene block and an uncoupled hydrogenated or non-hydrogenated vinyl-polyisoprene block.

Formula 2

(3)

In the vinyl-polyisoprene-block-containing styrene elastomer, the styrene content is 5 mass % or more and 30 mass % or less, preferably 10 mass % or more and 25 mass % or less. When the styrene content is less than 5 mass %, the hardness is low and the adhesion strength is too high. Thus, adhesive deposits may be caused on the adherend after peeling. Especially, adhesive deposits are easily caused on an adherend having an irregular surface such as a prism sheet. When the styrene content exceeds 30 mass %, the hardness is too high and thus the adhesion strength to the adherend is weak, so that the surface protective film may be peeled off. Especially, the surface protective film is easily peeled off from an adherend having an irregular surface such as a prism sheet.

Here, the styrene content means a styrene block content relative to the total amount of the vinyl-polyisoprene-block-containing styrene elastomer.

The styrene content is calculated by, for instance, the following method.

A block copolymer composition contained in the adhesion layer of the protective film is dissolved in a small amount of hexane and, then, an excessive amount of acetone is added thereto, so that the composition is separated into acetone-insoluble components and acetone-soluble components. The insoluble components are measured by an NMR (nuclear magnetic resonance spectrum method) so as to calculate the styrene content from an integral intensity ratio of spectrum.

A triblock copolymer is a block copolymer represented by the above general formula (1).

The triblock copolymer content is 80 mass % or more, preferably 90 mass % or more. When the triblock copolymer content is less than 80 mass %, the adhesion strength to the adherend is too high and thus adhesive deposits may be left after peeling. Also, since the adhesion strength to the rear surface of the base material layer is increased, unwinding property from the roll may be reduced.

The triblock copolymer content is calculated by, for instance, the following method.

The block copolymer composition contained in the adhesion layer of the protective film is dissolved in tetrahydrofuran (TFH). Two columns for liquid chromatography of GS5000H and two columns for liquid chromatography of G4000H (four columns in total) manufactured by Tosoh Corporation are connected in series. High-performance liquid chromatography is performed at a temperature of 40 degrees C. and a flow rate of 1 ml/min by using THF for a mobile phase. From the obtained chart, a coupling component, i.e., a peak area corresponding to a triblock copolymer, is obtained. A percentage of the peak area relative to an entire peak area is the triblock copolymer content.

The glass transition temperature of the vinyl-polyisoprene-block-containing styrene elastomer is −40 degrees C. or more and 20 degrees C. or less. When the glass transition temperature of the vinyl-polyisoprene-block-containing styrene elastomer is less than −40 degrees C., the adhesion strength is not easily exhibited in a typical usable temperature area (for instance, −20 degrees C. to 40 degrees C.) of the surface protective film and thus the surface protective film may be peeled off from the adherend. Especially, the surface protective film is easily peeled off from an adherend having an irregular surface such as a prism sheet.

The glass transition temperature is calculated by, for instance, the following method.

The block copolymer composition contained in the adhesion layer of the protective film is dissolved in a small amount of hexane and then an excessive amount of acetone is added thereto, so that the composition is separated into acetone-insoluble components and acetone-soluble components. The temperature of the insoluble components is raised from a room temperature at a ratio of 20 degrees C./min using a differential scanning calorimeter, and a calorific value is measured to depict an endothermic curved line. Two extended lines are added to the endothermic curved line. Then, the glass transition temperature is obtained from the intersection point of a half straight line between the extended lines and the endothermic curved line.

The vinyl-polyisoprene block content is calculated by, for instance, the following method.

A material pellet for the adhesion layer is dissolved in heavy chloroform and, then, measurement by the NMR (nuclear magnetic resonance spectrum method) is performed to calculate the vinyl-polyisoprene block content from an integral intensity ratio of spectrum.

It does not matter whether or not the vinyl-polyisoprene-block-containing styrene elastomer is hydrogenated.

Examples of the polyolefin used for the adhesion layer include low-density polyethylene, medium-density polyethylene, high-density polyethylene, linear low-density polyethylene, ethylene-α-olefin copolymer, ethylene-vinyl-acetate copolymer, ethylene-ethylacrylate copolymer, ethylene-methyl methacrylate copolymer, ethylene-n-butyl acrylate copolymer, and polypropylene (homopolymer, random copolymer, block copolymer). Among the above-described polyolefins, polypropylene is preferable as a material for the adhesion layer. Polypropylene is compatible with a styrene elastomer including a non-hydrogenated or hydrogenated vinyl-polyisoprene block and has an excellent heat resistance. In addition, polypropylene does not easily cause an adherend to be contaminated by bleed.

One polyolefin or a combination of two or more polyolefins may be used.

As a tackifier used for the adhesion layer, a resin selectively compatible with a hydrogenated or non-hydrogenated vinyl-polyisoprene block of a styrene elastomer can be used.

Such a resin may be aliphatic hydrocarbon resin, terpene resin, coumarone-indene resin, aromatic hydrocarbon resin or rosin resin.

Additives such as a softener (e.g. liquid polymer and paraffin oil), a filler, a pigment, an antioxidant, a stabilizer and an ultraviolet absorber may be added to the adhesion layer as needed.

The adhesion layer contains the polyolefin at a mass ratio of 0.1 or more and 2 or less relative to the vinyl-polyisoprene-block-containing styrene elastomer, and contains the tackifier at a mass ratio of 0.03 or more and 1 or less relative to the vinyl-polyisoprene-block-containing styrene elastomer.

When the mass ratio of the polyolefin relative to the vinyl-polyisoprene-block-containing styrene elastomer is less than 0.1, the adhesion strength to the adherend is too high and thus adhesive deposits may be left after peeling. Also, since the adhesion strength to the rear surface of the base material layer is increased, unwinding property from the roll may be reduced. When the mass ratio of the polyolefin relative to the vinyl-polyisoprene-block-containing styrene elastomer exceeds 2, the adhesion strength is weak and thus the surface protective film may be peeled off from the surface of the adherend. Especially, the surface protective film is easily peeled off from an adherend having an irregular surface such as a prism sheet.

The mass ratio of the polyolefin relative to the vinyl-polyisoprene-block-containing styrene elastomer is preferably 0.15 or more and 1 or less, more preferably 0.2 or more and 0.6 or less.

When the mass ratio of the tackifier relative to the vinyl-polyisoprene-block-containing styrene elastomer is less than 0.03, the adhesion strength is weak and thus the surface protective film may be peeled off from the surface of the adherend. Especially, the surface protective film is easily peeled off from an adherend having an irregular surface such as a prism sheet. When the mass ratio of the tackifier relative to the vinyl-polyisoprene-block-containing styrene elastomer exceeds 1, the adherend may be contaminated by bleed or cohesion force may be reduced.

The tackifier content is preferably 0.05 mass % or more and 0.5 mass % or less.

The thickness of the adhesion layer is 5 μm or more and 25 μm or less. When the thickness of the adhesion layer is less than 5 μm, an end of an adherend having an irregular surface may be damaged. Also, the adhesion strength may be reduced and thus the surface protective film may be peeled off from the adherend. When the thickness of the adhesion layer exceeds 25 μm, the adhesion strength to the adherend is too high and thus adhesive deposits may be left after peeling. Also, since the adhesion strength to the rear surface of the base material layer is increased, unwinding property from the roll may be reduced.

The thickness of the adhesion layer is preferably 10 μm or more and 20 μm or less.

The hardness (Martens hardness) of the adhesion layer is 1.0 N/mm$^2$ or more and 2.5 N/mm$^2$ or less. When the adhesion layer has an extremely low hardness, i.e., a hardness less than 1.0 N/mm$^2$, the adhesion strength to the adherend is increased and thus unwinding property from the roll may be reduced. When the adhesion layer has an extremely high hardness, i.e., a hardness higher than 2.5 N/mm$^2$, it becomes difficult for the surface protective film to conform to the unevenness of the adherend, so that a sufficient adhesion strength cannot be obtained and thus the surface protective film may be peeled off from the adherend.

The hardness of the adhesion layer is adjustable based on, for instance, the hardnesses of the vinyl-polyisoprene-block-containing styrene elastomer and the polyolefin, which are used for the adhesion layer. Further, when two or more polyolefins are used, the hardness of the adhesion layer is also adjustable based on the hardness of each polyolefin.

In the exemplary embodiment, the base material layer and adhesion layer are laminated by co-extrusion.

ADVANTAGES OF EXEMPLARY EMBODIMENT

According to the above-described exemplary embodiment, the following advantages can be attained.

The adhesion layer contains a styrene elastomer containing a non-hydrogenated or hydrogenated vinyl-polyisoprene block according to the exemplary embodiment. Accordingly, when a surface protective film is rolled up as a roll, the surface protective film can be easily wound off from the roll without applying a mold releasing treatment to the base material layer.

Thus, efficiency of operation for attaching the surface protective film to the surface of an adherend can be enhanced. Also, it is less likely that the base material layer is partially stretched and deformed or the adhesion layer is partially peeled to spoil the surface protective film. Further, since a mold releasing treatment for obtaining unwinding property from the roll is not required, manufacturing cost of the surface protective film can be reduced.

The adhesion layer contains a predetermined amount of polyolefin and tackifier while the styrene content is in the range of 5 mass % to 30 mass %, the triblock copolymer content is 80 mass % or more, and the glass transition temperature is in the range of −40 degrees C. to 20 degrees C. in the styrene elastomer. Thus, while the surface protective film reliably exhibits a favorable winding property from the roll, the adhesion strength of the adhesion layer to the adherend can be adjusted in a proper range where the surface protective film can appropriately function.

Since problems such as peeling and adhesive deposits are not easily occurred, the surface protective film can be favorably used for an adherend having an irregular surface such as a prism sheet.

Since the thickness of the adhesion layer is in the range of 5 μm to 25 μm, the surface of an adherend having an irregular surface such as a prism sheet can be favorably protected.

In other words, it is less likely that an irregular surface is damaged because the adhesion layer is too thin, adhesive deposits are left after peeling because the adhesion layer is too thick, or unwinding property from the roll is reduced.

The hardness (Martens hardness) of the adhesion layer is in the range from 1.0 N/mm$^2$ to 2.5 N/mm$^2$. Accordingly, when a surface protective film is rolled up as a roll, the surface protective film can be easily wound off from the roll without applying a mold releasing treatment to the base material layer.

Further, it is less likely that the surface protective film has a difficulty in extending along the unevenness of an adherend because of an extremely high hardness of the adhesion layer, so that a sufficient adhesion strength cannot be obtained and thus the surface protective film may be peeled off from the adherend.

In other words, by appropriately adjusting the hardness of the adhesion layer, the adhesion strength can be controlled. For instance, the adhesion strength is adjustable based on, for instance, the respective hardnesses of the styrene elastomer and the polyolefin contained in the adhesion layer.

Since the base material layer and the adhesion layer are laminated by co-extrusion, the base material layer and the adhesion layer can be laminated at the same time without a solvent, thus producing a surface protective film by a relatively simple manufacturing device. Also, due to a simplified manufacturing process, manufacturing cost of the surface protective film can be reduced to a moderate level. Further, in a surface protective film formed by co-extrusion, the inter-laminar strength of a surface of the base material layer and the adhesion layer is high. In addition, such a surface protective film hardly leaves adhesive deposits when being peeled off from the adherend.

Modifications

The invention is not limited to the above-described embodiment but also includes modifications and improvements as long as an object of the invention can be achieved.

Although the surface protective film exemplarily includes the base material layer and the adhesion layer in the exemplary embodiment, the surface protective film may include other functional layers such as an ultraviolet absorbing layer. In this instance, a surface of an adherend can be protected not only from physical contact but also from other factors such as ultraviolet rays.

The specific material, arrangement and the like described in carrying out the invention can be altered as long as an object of the invention can be achieved.

EXAMPLES

The invention will further be described below with reference to Examples and Comparatives. Note that the invention is not limited to Examples.

Example 1

A vinyl-polyisoprene-block-containing styrene elastomer (manufactured by KURARAY CO., LTD., brand name: HYBRAR7125, hardness: 64 (JIS(Japanese Industrial Standard) K-6253)), in which the styrene content is 20 mass %, the triblock copolymer content is 100 mass %, and the glass transition temperature is −15 degrees C., was mixed with polyolefins such as RPP (manufactured by Japan Polypropylene Corporation, brand name: WINTEC WFW-4, Martens hardness: 43.4) and LLDPE (manufactured by Prime Polymer Co., Ltd., brand name: MORETEC 1018G, Martens hardness: 9.9) and a tackifier (manufactured by Idemitsu Kosan Co., Ltd., brand name: I-MARV P-140), thereby providing a material for the adhesion layer. The respective mass ratios of RPP, LLDPE and tackifier were 0.13, 0.04 and 0.17.

By co-extruding the material for the adhesion layer and BPP (manufactured by SunAllomer Ltd., brand name: PC-684S) used as a material for the base material layer such that the adhesion layer had an 11 μm thickness and the base material layer had a 39 μm thickness, a surface protective film was obtained Example 2

A surface protective film was obtained in the same manner as in Example 1 except for changing the respective mass ratios of RPP and LLDPE added as polyolefins to 0.09 and 0.08.

Example 3

A surface protective film was obtained in the same manner as in Example 1 except for changing the mass ratio of LLDPE added as a polyolefin to 0.17 and adding no RPP.

Example 4

A vinyl-polyisoprene-block-containing styrene elastomer (manufactured by KURARAY CO., LTD., brand name: HYBRAR7311, hardness: 41 (JIS K-6253)), in which the styrene content is 13 mass %, the triblock copolymer content is 100 mass %, and the glass transition temperature is −32 degrees C., was mixed with a polyolefin such as RPP (manufactured by Japan Polypropylene Corporation, brand name: WINTEC WFW-4, Martens hardness: 43.4 N/mm$^2$) and a tackifier (manufactured by Idemitsu Kosan Co., Ltd., brand name: I-MARV P-140), thereby providing a material for the adhesion layer. The respective mass ratios of RPP and the tackifier were both 0.17.

By co-extruding the material for the adhesion layer and BPP (manufactured by SunAllomer Ltd., brand name: PC-684S) used as a material for the base material layer such that the adhesion layer had an 11 μm thickness and the base material layer had a 39 μm thickness, a surface protective film was obtained.

Comparative 1

A surface protective film was obtained in the same manner as in Example 1 except for changing the mass ratio of RPP added as a polyolefin to 0.17 and adding no LLDPE.

Comparative 2

A surface protective film was obtained in the same manner as in Example 4 except for adding LLDPE as a polyolefin at a mass ratio of 0.17 and adding no RPP.

Evaluation Method

1. Adhesion Strength

Each of the surface protective films according to Examples 1 to 4 and Comparatives 1 and 2 was attached to an acrylic resin prism sheet having a cross section shaped in a triangle having an apex angle of approximately 90 degrees and a height of approximately 30 μm, and then initial adhesion strength and time-dependent adhesion strength were measured. The case where the measured resistance was in the range of 0.03N/25 mm to 0.15N/25 mm was represented by A, and the case where the measured resistance was out of the range of 0.03N/25 mm to 0.15N/25 mm was represented by B.

Initial Adhesion Strength

Each surface protective film was attached to an adherend (prism sheet) under a linear pressure of 0.38 MPa at 2 m/min and stored at 23 degrees C. for 24 hours.

Then, the surface protective film was peeled off at a tensile speed of 0.3 m/min and 180 degrees peel using a tensile testing machine, and then a resistance was measured.

Time-dependent Adhesion Strength after Warming

The surface protective film was attached to an adherend (prism sheet) under a linear pressure of 0.38 MPa at 2 m/min and stored at 50 degrees C. for 1 week.

Then, the surface protective film was peeled off at a tensile speed of 0.3 m/min and 180 degrees peel using a tensile testing machine, and then a resistance was measured.

2. Hardness (Martens Hardness) of Adhesion Layer

A Martens hardness was measured at a testing force of 1 mN and a load speed of 0.05 mN/sec using a ultramicro hardness tester (manufactured by Fischer Instruments K.K., HM2000S).

3. Unwinding Strength

An adhesion surface of the surface protective film was pressed to be attached to the rear surface of the base material layer under a linear pressure of 0.38 MPa at 2 m/min and stored at 23 degrees C. for 5 minutes.

Then, the surface protective film was peeled off at a tensile speed of 0.3 m/min and 90 degrees peel using a tensile testing machine, and then a resistance was measured. The case where the measured resistance was 0.5N/25 mm or less was represented by A, and the case where the measured resistance was more than 0.5N/25 mm was represented by B.

Evaluation Results

The evaluation results are shown in Table 1.

As obvious from the table 1, the surface protective films according to Examples 1 to 4 using an arrangement according to an aspect of the invention exhibited favorable adhesion strength and unwinding strength. The adhesive force and unwinding property were stably maintained for a long time.

Contrarily, the surface protective film of Comparative 1, in which the Martens hardness of the adhesion layer is more than 2.5 N/mm², had weak initial and time-dependent adhesion strengths.

Further, the surface protective film of Comparative 2, in which the Martens hardness of the adhesion layer is less than 1.0 N/mm², had a poor unwinding strength.

The invention claimed is:

1. A surface protective film comprising:
   a polyolefin base material layer; and
   an adhesion layer laminated on the polyolefin base layer,
     wherein the adhesion layer comprises:
       a vinyl-polyisoprene-block-containing styrene elastomer;
       a polyolefin; and
       a tackifier,
       wherein a mass ratio of the polyolefin relative to the vinyl-polyisoprene-block-containing styrene elastomer is 0.1 or more and 2 or less, and
     wherein a hardness (Martens hardness) of the adhesion layer is 1.0 N/mm² or more and 2.5 N/mm² or less, and
     wherein the adhesion layer has adhesion properties such that it is capable of being adhered to an adherend but also capable of being peeled off of an adherend.

2. The surface protective film according to claim 1, wherein a mass ratio of the tackifier relative to the vinyl-polyisoprene-block-containing styrene elastomer is 0.03 or more and 1 or less.

3. The surface protective film according to claim 1, wherein the styrene elastomer comprises styrene at 5 mass % or more and 30 mass % or less and triblock copolymer at 80 mass % or more, and
a glass transition temperature of the styrene elastomer is −40 degrees C. or more and 20 degrees C. or less.

4. The surface protective film according to claim 1, wherein, the thickness of the adhesion layer is 5 μm or more and 25 μm or less.

5. The surface protective film according claim 1, wherein, the adhesion layer is laminated by co-extrusion.

TABLE 1

| | | | Example 1 | | Example 2 | | Example 3 | | Example 4 | | Comparative 1 | | Comparative 2 | |
|---|---|---|---|---|---|---|---|---|---|---|---|---|---|---|
| composition of adhesion layer | styrene elastomer | styrene content (mass %) | 20 | | 20 | | 20 | | 13 | | 20 | | 13 | |
| | | triblock copolymer content (mass %) | 100 | | 100 | | 100 | | 100 | | 100 | | 100 | |
| | | existence or nonexistence of vinyl-polyisoprene block | present | | present | | present | | present | | present | | present | |
| | | glass transition temperature (° C.) | −15 | | −15 | | −15 | | −32 | | −15 | | −32 | |
| | | mixed ratio (mass ratio) | 1 | | 1 | | 1 | | 1 | | 1 | | 1 | |
| | mixed ratio of polyolefin (mass %) | RPP | 0.13 | | 0.09 | | 0 | | 0.17 | | 0.17 | | 0 | |
| | | LLDPE | 0.04 | | 0.08 | | 0.17 | | 0 | | 0 | | 0.17 | |
| | mixed ratio of tackifier (mass ratio) | | 0.17 | | 0.17 | | 0.17 | | 0.17 | | 0.17 | | 0.17 | |
| thickness of adhesion layer (μm) | | | 11 | | 11 | | 11 | | 11 | | 11 | | 11 | |
| composition of base material layer | | | BPP | | BPP | | BPP | | BPP | | BPP | | BPP | |
| thickness of base material layer (μm) | | | 39 | | 39 | | 39 | | 39 | | 39 | | 39 | |
| Martens hardness (N/mm²) | | | 2.0 | | 1.6 | | 1.4 | | 1.7 | | 2.8 | | 0.7 | |
| initial adhesion strength (N/25 mm) | | | 0.06 | A | 0.08 | A | 0.10 | A | 0.08 | A | 0.02 | B | 0.13 | A |
| time-dependent adhesion strength (N/25 mm) | | | 0.06 | A | 0.08 | A | 0.10 | A | 0.07 | A | ≈0 | B | 0.12 | A |
| unwinding strength (N/25 mm) | | | 0.10 | A | 0.12 | A | 0.21 | A | 0.47 | A | 0.01 | A | 2.77 | B |

6. The surface protective film according claim 1, wherein the base material layer and the adhesion layer are a laminate prepared by co-extrusion.

7. The surface protective film according claim 1, wherein the adhesion layer is provided on at least one of the surfaces of the surface protective film.

8. The surface protective film according claim 1, wherein a mass ratio of the polyolefin relative to the vinyl-polyisopreneblock-containing styrene elastomer is 0.15 or more and 1 or less.

9. The surface protective film according claim 1, wherein a mass ratio of the polyolefin relative to the vinyl-polyisoprene-block-containing styrene elastomer is 0.2 or more and 0.6 or less.

10. The surface protective film according claim 1, wherein a mass ratio of the tackifier relative to the vinyl-polyisoprene-block-containing styrene elastomer is 0.05 or more and 0.5 or less.

11. The surface protective film according claim 1, wherein the vinyl-polyisoprene-block-containing styrene elastomer is a block copolymer represented by a formula (1) or formula (2) below:

A-B-A  (1)

A-B  (2)

wherein A represents a styrene block and B represents a non-hydrogenated vinyl-polyisoprene block or hydrogenated vinyl-polyisoprene block represented by formula (3) as follows:

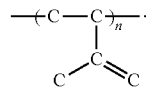

(3)

12. A roll comprising a surface protective film according to claim 1 wound in a roll shape.

13. A method for making a surface protective film according claim 1, which comprises: co-extruding and laminating a polyolefin base material layer and an adhesion layer comprising a vinyl-polyisoprene-block-containing styrene elastomer, a polyolefin and a tackifier, such that the adhesion layer has a hardness (Martens hardness) of 1.0 N/mm$^2$ or more and 2.5 N/mm$^2$ or less.

14. A method for protecting the surface of an adherend, comprising adhering a surface protective film according claim 1 on the adherend.

15. The method for protecting the surface of an adherend according to claim 14, wherein the adherend has an irregular surface.

* * * * *